No. 827,031. PATENTED JULY 24, 1906.
G. A. OLSON.
COMPRESSION PULLEY FOR HAY SLING CARRIERS.
APPLICATION FILED FEB. 5, 1906.

Witnesses,
W. H. Palmer
Emily F. Otis

Inventor,
Gustav A. Olson.
by Lothrop & Johnson
his Attorneys.

UNITED STATES PATENT OFFICE.

GUSTAV A. OLSON, OF ALBERT LEA, MINNESOTA.

COMPRESSION-PULLEY FOR HAY SLING-CARRIERS.

No. 827,031.　　　　Specification of Letters Patent.　　　Patented July 24, 1906.

Application filed February 5, 1906. Serial No. 299,440.

*To all whom it may concern:*

Be it known that I, GUSTAV A. OLSON, a citizen of the United States, residing at Albert Lea, in the county of Freeborn and State of Minnesota, have invented certain new and useful Improvements in Compression-Pulleys for Hay Sling-Carriers, of which the following is a specification.

My invention relates to improvements in compression-pulleys for hay sling-carriers, and particularly those having a triple hoisting-rope, its object being to provide sling-pulleys so constructed and connected that when raised they will both be supported and maintained without the use of special interlocking devices as now commonly used.

To this end my invention consists in the features of construction, combination, and arrangement of parts hereinafter described and claimed.

Figure 1:
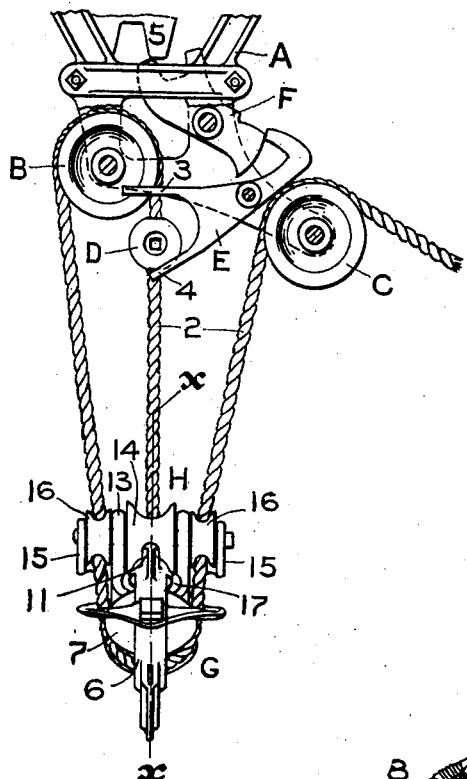
Figure 2:
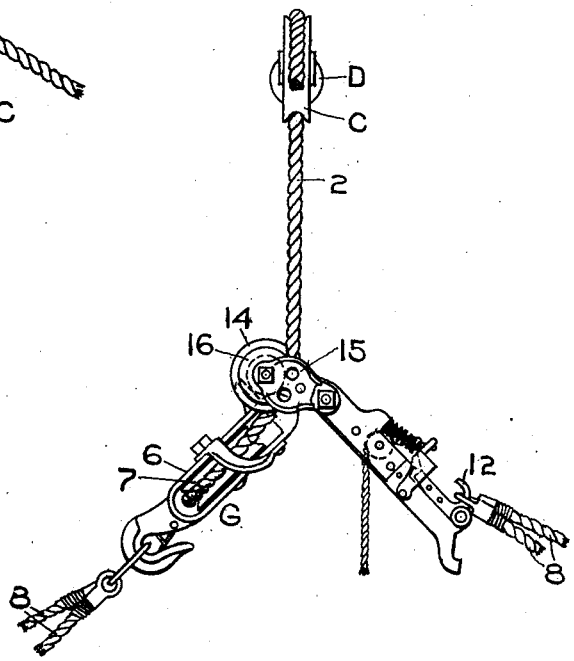
Figure 3:
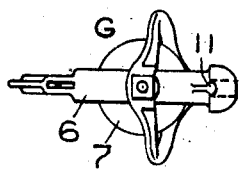
Figure 5:
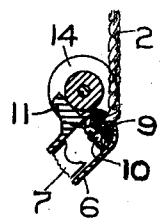
Figure 4:
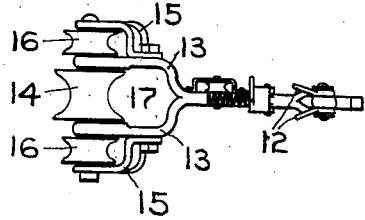

In the accompanying drawings, forming part of this specification, Figure 1 is a front view of so much of the carrier as is necessary to show my invention, the sling-pulleys being shown in raised position and one side of the frame being partly broken away in order better to exhibit the parts. Fig. 2 is a side view of the sling-pulleys and draft-rope alone. Fig. 3 is a rear view of the suspension-pulley alone. Fig. 4 is a front view of the supported pulley alone, and Fig. 5 is a vertical section through the engaged pulleys on line $x\ x$ of Fig. 1.

In the drawings is shown a sling-carrier similar in construction and operation to that shown and described in my United States Letters Patent dated December 12, 1905, numbered 806,829. As shown, A represents the frame partly broken away, and B and C the draft-pulleys over which the hoisting-rope 2 passes. D is a trip-block secured to the fixed portion of the hoisting-rope in position to engage the upper fork 3 of the catch E when the hoisting-rope is pulled to raise the load and be intercepted and held by the lower fork 4 of the catch when the hoisting-rope is released. F is a pivoted dog in position to engage the track-stop 5 at one end and the catch E at the other end. The construction and operation of these parts, which form no part of the present invention, are fully described and shown in my said application for patent, to which reference is here made.

My invention resides more particularly in the construction and arrangement of the sling-pulleys and their method of suspension from the hoisting-rope. These pulleys consist of a suspension-pulley G and a supported pulley H. The suspension-pulley has a frame 6, in which is journaled a horizontal sheave 7. To one end of the frame is secured the end of the hoisting-rope 2 and to the other end are detachably connected the sling-ropes 8. As shown in the drawings, the hoisting-rope is secured to the pulley-frame by being passed through a hole 9 in the pulley-head and then knotted, as at 10. The pulley-frame is made with a lateral stop 11 in position to engage the other pulley, as hereinafter described.

The supported pulley H is formed at one end with suitable means, such as the hooks 12, for attachment of the sling-ropes, and at the other end with yoke-arms 13, between which is journaled a vertical sheave 14. On each yoke-arm is a lateral bracket 15, between which and the yoke-arm is journaled a side sheave 16. The yoke-arms 13 are spaced apart to form between them an opening 17 large enough for the trip-block D to pass through.

The end of the hoisting-rope is secured to the suspension-pulley G, as described. It is then carried through the opening 17 between the yoke-arms 13 of the supported pulley and over the central vertical sheave 14 thereof, then up and over the draft-pulley B of the carrier, then down over one of the vertical side sheaves 16 of the supported pulley, around the horizontal sheave 7 of the suspension-pulley, up over the other side sheave 16, and then up over the draft-pulley C of the carrier. Thus the pulley G, having the horizontal sheave, is suspended from the hoisting-rope, while the supported pulley H is runningly arranged upon the fixed or middle portion of the rope above it. Consequently when the hoisting-rope is pulled to raise the load hung upon the sling-pulleys the draft comes in the first instance directly upon the suspension-pulley, which is drawn up until the stop 11, centrally arranged at the top of the suspension-pulley, comes up beneath and engages the central sheave 14 of the supported pulley, the trip-block D having in the meantime been drawn up through the opening 17 in the supported pulley, as best shown in Fig.

2 of the drawings. In this position the pulley H will be supported directly upon the pulley G, and any further pull upon the hoisting-rope will be distributed between the two pulleys.

When the trip-block is held and intercepted by the forked catch E, as shown in Fig. 1, the sling-pulleys will be held and maintained in the raised position shown in the drawings even though the hoisting-rope be slackened, for the pulley G is suspended directly from the fixed portion of the rope, which is held by means of the trip-block and catch, as described. The supported pulley cannot drop or sag, as it is held up by the suspended pulley, which is too large to pass through the opening 17 of the supported pulley, even if the stop 11 were not there. Nevertheless I prefer to use the stop 11 as it keeps the entire pulley-frame out of the opening and prevents the pulleys from fouling and jamming. Thus I am enabled to dispense with the usual automatic interlocking devices which are necessary in the usual arrangement to keep the lower pulley from dropping when the draft-rope is released.

It will be noticed that the sheave in the suspension-pulley is arranged at approximately right angles with the sheaves in the supported pulley. To these sheaves I have applied the terms "horizontal" and "vertical," respectively, as a convenient means of designating their arrangement.

I claim—

1. In a hay-carrier, the combination, with the hoisting-rope, of a suspension sling-pulley secured to the end of the hoisting-rope and a supported sling-pulley runningly arranged upon the hoisting-rope above the suspension-pulley.

2. In a hay-carrier, the combination, with the hoisting-rope, of a suspension sling-pulley secured to the end of the hoisting-rope and a supported sling-pulley runningly arranged upon the hoisting-rope above the suspension-pulley, the suspension-pulley being constructed to engage and support the supported pulley when the hoisting-rope is drawn up.

3. In a hay-carrier, the combination, with the hoisting-rope, of a suspension sling-pulley secured to the end of the hoisting-rope and having a horizontal sheave, and a supported sling-pulley having a vertical sheave and being runningly arranged upon the fixed portion of the hoisting-rope above the suspension-pulley.

4. In a hay-carrier, in combination, a hoisting-rope, a trip-block secured thereon, means to support and hold the trip-block when in raised position, a suspension sling-pulley secured to the end of the hoisting-rope, and a supported sling-pulley runningly arranged upon the hoisting-rope above the suspension-pulley and below the trip-block.

5. In a hay-carrier, in combination, a triple hoisting-rope, a suspension sling-pulley secured to the middle portion of the rope and having a horizontal sheave, a trip-block also secured to the middle portion of the rope but above the suspension-pulley, means to support and hold the trip-block in raised position, and a supported sling-pulley runningly arranged upon the middle and side portions of the rope above the suspension-pulley.

6. In a hay-carrier, in combination, a hoisting-rope, a trip-block secured thereon, means to support and hold the trip-block when raised, a suspension sling-pulley secured to the end of the hoisting-rope, and a supported sling-pulley runningly arranged upon the hoisting-rope above the suspension-pulley and below the trip-block, the suspension-pulley having a stop in position to engage the supported pulley when the hoisting-rope is pulled to raise the pulleys.

In testimony whereof I affix my signature in presence of two witnesses.

GUSTAV A. OLSON.

Witnesses:
ALFRED CHRISTOPHERSON,
BEN. H. CLEMENT.